United States Patent [19]
Watvedt et al.

[11] Patent Number: 5,302,354
[45] Date of Patent: Apr. 12, 1994

[54] FILTRATION DEVICE

[75] Inventors: Jorn S. Watvedt, Degernes, Norway; Staffan B. Linnersten, Raleigh, N.C.

[73] Assignee: Pall Corporation, Glen Cove, N.Y.

[21] Appl. No.: 903,928

[22] Filed: Jun. 26, 1992

[51] Int. Cl.$^5$ .............. B01D 27/06; B01D 29/07; B01D 50/00; B01D 53/34
[52] U.S. Cl. .................................. 422/177; 55/486; 55/521; 96/134; 96/135; 210/493.1; 210/493.5; 210/502.1; 422/171
[58] Field of Search .............. 422/169, 171, 177, 181, 422/184, 192; 55/316, 486, 521; 210/493.1, 493.5, 502.1; 96/134, 135

[56] References Cited

U.S. PATENT DOCUMENTS

| | | | |
|---|---|---|---|
| 3,368,687 | 2/1968 | Ruschman | 210/493.1 |
| 3,385,039 | 5/1968 | Burke et al. | 55/521 |
| 3,744,976 | 7/1973 | Tongue | 422/169 |
| 4,350,504 | 9/1982 | Diachuk | 422/169 |
| 5,129,929 | 7/1992 | Linnersten | 55/316 |

Primary Examiner—Robert J. Warden
Assistant Examiner—L. M. Crawford
Attorney, Agent, or Firm—Leydig, Voit & Mayer

[57] ABSTRACT

A filtration device has a particulate filter element and a sorbent filter element having different flow properties. When viewed in cross section, the particulate filter element has inner and outer legs that form generally the shape of a W and define a space between the outer legs. The sorbent filter element is disposed in the space within the first filter element.

14 Claims, 3 Drawing Sheets

1

FILTRATION DEVICE

BACKGROUND OF THE INVENTION

This invention relates to a filtration device equipped with a plurality of filter elements having different filtering characteristics. More particularly but not exclusively, it relates to a filtration device for removing particulate matter and odors from air, such as the air in a cabin of an aircraft.

Filters for use in certain working environments need to be designed for minimum total pressure drop across the filter. This is particularly true in the case of filters for use in aircraft cabins. A low total pressure drop across such a filter is desirable because the lower the total pressure drop, the smaller are the size and the weight of the air flow equipment, such as blowers, necessary for passing air through the filter, permitting a decrease in the weight of the aircraft or an increase in the cargo that can be carried.

The air in an aircraft cabin contains a large variety of contaminants which it is desirable to remove, such as fibers from clothing, carpets, and seat cushions, cigarette smoke, odors from the galley and lavatories, and human body odors. Fibers and a certain amount of the tar in cigarette smoke can be effectively removed by a particulate filter, which employs a mass of fibers to entrap particulate contaminants. Minute aerosol particles and odors, on the other hand, are usually removed from air or rendered innocuous by what is referred to as a sorbent filter. A sorbent filter normally employs an adsorbent, such as activated charcoal, which adsorbs odor-causing hydrocarbons and other chemicals from air passing through the filter. The air which leaves the sorbent filter has a lower concentration of the substances responsible for the odors, so the air is less odorous.

In an aircraft it is generally desirable to install a particulate filter and a sorbent filter in series in close proximity. One reason for this manner of installation is to save space inside the aircraft, which is always at a premium. Another reason is that a sorbent filter usually does not have a large external surface area, so unless the air entering the sorbent filter is free of fibers, the external surface of the sorbent filter can soon become clogged with fibers, resulting in a high pressure drop across the filter. Therefore, it is desirable to install a particulate filter just upstream of a sorbent filter. However, because the airflow characteristics are quite different for a particulate filter and a sorbent filter, conventional arrangements have not resulted in a minimal total pressure drop and have not made optimal use of space.

SUMMARY OF THE INVENTION

It is an object of the present invention to provide a filtration device which includes a plurality of filter elements having different filtering characteristics in which the total pressure drop across the device is minimized.

It is yet another object of the present invention to provide a filtration device which is extremely compact.

It is a further object of the present invention to provide a filtration device which is particularly suited for the filtration of air aboard an aircraft.

A filtration device according to the present invention comprises a first filter element and a second filter element having different filtering characteristics. The first filter element has first and second inner legs and first and second outer legs that. The first and second inner legs are connected to each other at first ends and connected to the first and second outer legs, respectively, at second ends such that the first filter element generally forms the shape of a W. The height of the first and second inner legs is less than the height of the first and second outer legs and a space is defined between the first and second outer legs. The second filter element includes first and second legs which contact the first and second outer legs of the first filter, respectively, at first ends. This configuration prevents bypass flow between the first and second legs of the second filter element and the first and second outer legs of the first filter element. The second filter element is disposed in the space within the first filter element. The first filter element includes a porous medium for removing particulates from a gas, such as air. The second filter element includes a sorbent bed for removing chemical substances from the gas.

With this configuration, spaces having a wedge-shaped cross section may be formed between the surfaces of the first and second filter elements. As a result, the first and second filter elements produce independent pressure drops, so the configuration of each element can be optimized to minimize the total pressure drop.

DESCRIPTION OF PREFERRED EMBODIMENTS

Figure 1:
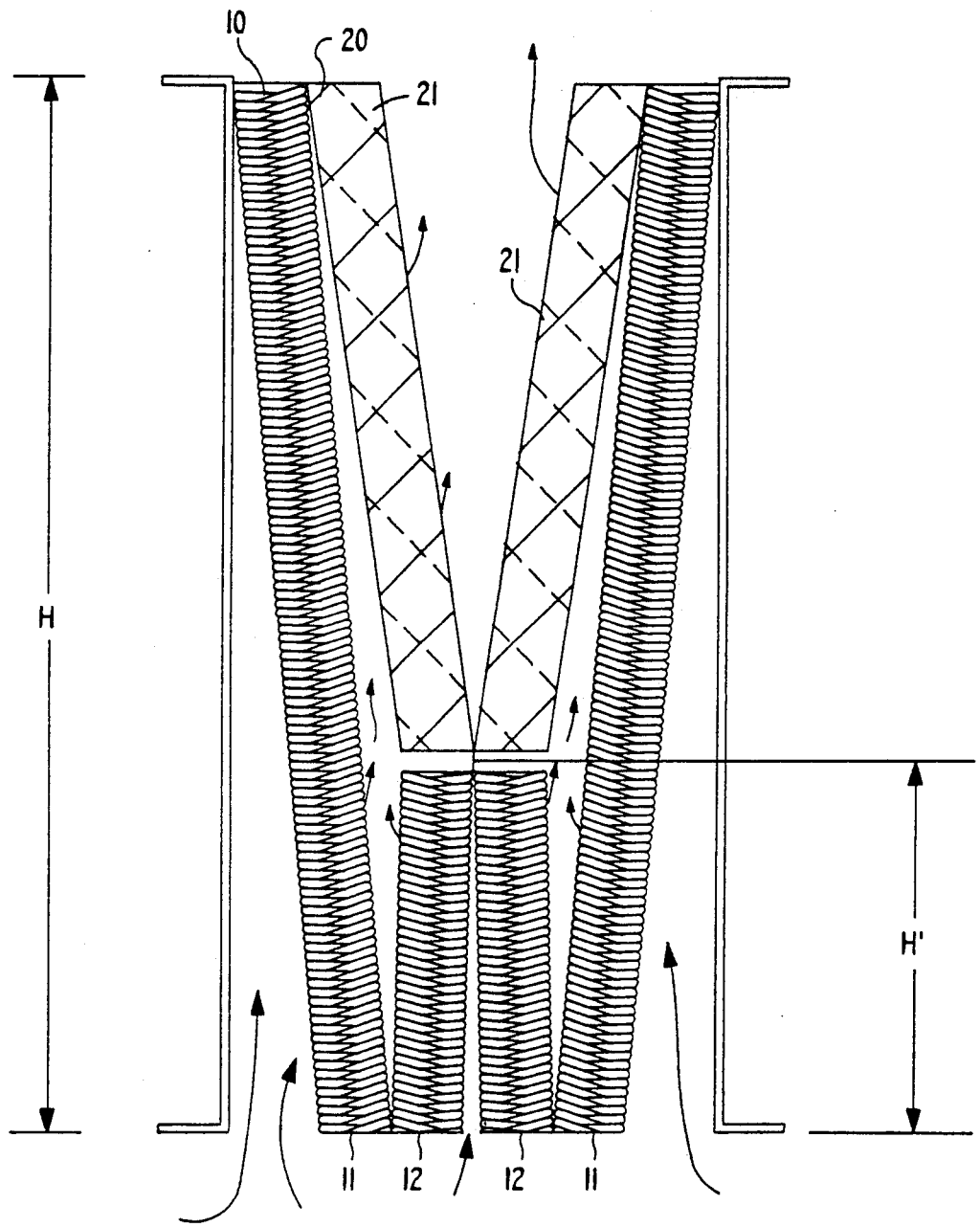
FIG. 1 is a cross-sectional view of one embodiment of a filtration device according to the present invention.

A number of preferred embodiments of a filtration device according to the present invention will now be described while referring to the accompanying drawings. FIG. 1 is a cross-sectional view of an embodiment for use in filtration of cabin air of an aircraft. It comprises a first filter element 10, at least a portion of which has a generally W-shaped cross-section, and a second filter element 20, at least a portion of which has a generally V-shaped cross section. The second filter element 20 is disposed inside the first filter element 10 with the vertex of the V extending towards the central vertex of the W. The first and second filter elements have different filtering characteristics. In the present embodiment the first filter element 10 is a pleated particulate filter element for removing particulate matter including fibers from a gas, such as air, and the second filter element 20 is a sorbent filter element for removing and/or rendering innocuous odor-causing substances and other undesirable substances from air that has been filtered by the particulate filter element. Therefore, the first filter element 10 will be referred to as a particulate filter element and the second filter element 20 will be referred to as a sorbent filter element.

A particulate filter element generally has a much larger surface area and different flow characteristics than a sorbent filter element, so the flow through the filtration device (shown by arrows in FIG. 1) is preferably directed such that the particulate filter element 10 is disposed on the upstream side rather than the downstream side of the sorbent filter element 20. With its larger external surface area, the particulate filter element 10 can remove particles and fibers from the air which would foul the external surface of the sorbent filter element 20 were the sorbent filter element 20 disposed on the upstream side of the device. When the particulate being filtered is not one that could easily clog the sorbent filter element 20, then it is possible for the sorbent filter element 20 to be upstream of the particulate filter element 10.

As viewed in cross section, the particulate filter element 10 has a pair of outer legs 11 and a pair of inner legs 12 that are shorter than the outer legs 11. The inner legs 12 are connected to the outer legs 11 at their one ends and to each other at their other ends. As viewed in cross section, the sorbent filter element 20 has two legs 21 that are connected to each other at their one ends and to the outer legs 11 of the particulate filter element 10 at their other ends. The particulate filter element 10 is disposed between a pair of partitions that guide air along its outer legs 11. The partitions may be the sides of a filter housing.

In the embodiment of FIG. 1, for ease of manufacture and compactness, each leg of the particulate filter element 10 contacts and is connected to one of its other legs. However, this arrangement is not mandatory, and the ends of the adjoining legs of the particulate filter element 10 can be separated from one another by gaps, with some connecting member which prevents the flow of air between adjoining legs disposed in each gap. Similarly, the upstream ends of the legs 21 of the sorbent filter element 20 need not contact each other. However, if they are separated by a gap, some means is preferably provided for preventing air from flowing through the gap between the legs 21. Further, the upstream ends of the legs 21 of the sorbent filter element 20 need not contact the upstream ends of the outer legs 11 of the particulate filter element 10 as shown in FIG. 1 as long as some means is provided to prevent air from bypassing the sorbent filter element. Preferably, there is contact to minimize the size of the filtration device and prevent bypass flow.

The particulate filter element 10 is not restricted to any particular type and can be chosen in accordance with the substances to be removed from the air being filtered. A particulate filter element for use in filtration of air in an aircraft cabin is usually a pleated filter element, the crest of each pleat preferably extending in parallel with the junction of the inner legs 12 along the central vertex of the W-shaped particulate filter element. The peak-to-peak spacing of the pleats is not critical and will depend on a number of factors, such as the thickness of the filtering medium employed in the particulate filter element and the pleat height. For particulate filter elements used in aircraft, the pitch of the pleats is generally between 10 and 15 pleats per inch. The height of the pleats will depend on the total dimensions of the filter element, but usually is from ¼ to 1 inch in particulate filter elements for aircraft. Shallow pleats are preferred.

Particulate filter elements for air can be made of a great variety of porous media, but those for use in aircraft preferably have a prescribed degree of flame resistance. Consequently, they are most commonly made from glass fibers. An example of a suitable particulate filter element having sufficient flame resistance is a fibrous depth filter medium made of a resin-impregnated glass fiber matrix. However, any other type of porous medium that is capable of meeting the flame resistance standards set forth for materials for the inside of aircraft can be employed.

The thickness of the material that is corrugated to form the particulate filter element may vary and can be chosen based on factors such as pressure drop across the filter element and the loading capacity of the filter element. The effective pore size and pore structure of the material may also vary and can be chosen based on factors such as removal efficiency. For example, particulate filter elements for use in aircraft commonly preferably have a removal efficiency of at least 89% for 0.3 micrometer particles of monodispersed dioctylphthalate (DOP). However, the desired removal efficiency of the particulate filter element will depend on the environment in which the filtration device is to be employed.

Many of the characteristics of the particulate filter element 10 are similar to the characteristics of the filter described in U.S. Pat. No. 5,098,767, which is incorporated herein by reference. For example, the filter media, the bending radius of the pleats, and the method of fabricating the particulate filter element 10 may be similar to those described in U.S. Pat. No. 5,098,767.

The sorbent filter element 20 of this embodiment can be made of any material suitable for removing or rendering innocuous odors or other undesirable substances from air. The sorbent is typically an adsorbent material such as activated carbon, activated alumina, silica gel, a natural zeolite, a synthetic molecular sieves, or a sorbent clay. The effectiveness of the adsorbent can be increased by activating it or impregnating it with an oxidizing agent, such as potassium permanganate, or a caustic alkali, such as sodium hydroxide.

The sorbent material is typically in the form of particles which may vary in size. For example, particles of carbon may be very fine while particles of alumina may be relatively large, e.g., about 0.25 inch in diameter. The particles of sorbent material may be contained in any suitable manner which provides a permeable body of desired shape. For example, particles of activated carbon may be contained in a fine mesh screen while particles of alumina may be contained in a perforated aluminum casing. Alternatively, the sorbent particles may be immobilized in a self-supporting mass by dispensing them in a fiber matrix or bonding them to one another with a binding agent. If the sorbent material might release fines, a dust filter may be disposed on the downstream side of the sorbent filter element to retain the fines. For example, the aluminum casing may be lined with a sheet of a thin porous material which produces a small pressure drop.

The shape of the sorbent filter element may vary and may be chosen, for example, in accordance with the desired characteristics of the sorbent filter element and the properties of the sorbent material. For example, after a certain number of hours of service (depending on the type of sorbent material and the substances being removed or rendered innocuous), the sorbent material in the sorbent filter element becomes saturated and ceases to sorb odor-causing substances from air passing through the sorbent filter element. This phenomenon is referred to as breakthrough. In the sorbent filter element 20 shown in FIG. 1, each of the legs have a rectangular cross-section and the sorbent filter element 21 generally has a V-shaped cross-section. Because the width of the rectangular cross-section is constant, breakthrough occurs practically simultaneously over the length of the legs 21, providing the filter device is designed to establish an even air flow through the sorbent filter element 20.

On the other hand, the shape of the sorbent filter element may be designed to provide a more gradual breakthrough. For example, in the embodiment shown in FIG. 2, the particulate filter element 10 is similar to that in FIG. 1 but the sorbent filter element 20 has a different shape from that in FIG. 1. In the sorbent filter element 20 shown in FIG. 2, each of the legs 21 has a tapered cross-section, and a stem 22 extends from the legs 21 to the central vertex of the W-shaped particulate filter element 10. Thus, the sorbent filter element 20 of FIG. 2 has a generally Y-shaped cross-section. Breakthrough will occur first at the thinnest portions of the legs 21, then at the thicker portions of the legs 21, and finally in the relatively thick stem 22. Accordingly, the overall substance removing capacity of the Y-shaped sorbent filter element 21 will decrease more gradually from the moment of the first breakthrough until all of the sorbent material becomes saturated.

The sorbent filter element is not limited to a V or Y-shaped cross-section or to a rectangular or tapered cross-section but may comprise any combination of shapes. For example, as shown in FIG. 3, the particulate filter element 10 is similar to that in FIG. 1 but the sorbent filter element 20 has a different shape than that of FIG. 1 or FIG. 2. The sorbent filter element 20 of FIG. 3 extends across several particulate filter elements 10 and includes several troughs 23 connected by flat sections 24. Each trough 23 has converging legs 25, 26 and is positioned in the space between the outer legs 11 of the corresponding particulate filter element 10. The apex of each trough 23 is relatively thick to provide a more gradual breakthrough. The flat connecting sections 24 overlie the outer legs 11 of adjacent particulate filter elements 10. Connecting each of the troughs 23 facilitates manufacture and installation of the sorbent filter element 20.

In addition, the sorbent filter element may also include an indicator that shows saturation of the sorbent filter element 20. The indicator can be attached to the downstream surface of the sorbent filter element 20. Such an indicator changes color when breakthrough occurs, and so a person inspecting the filter device from the outside can easily determine when the sorbent filter element 20 needs to be replaced.

As shown in FIG. 1, wedge-shaped spaces are formed between adjoining legs of the particulate filter element 10, between adjoining legs 21 of the sorbent filter element 20, between the particulate filter element 10 and the sorbent filter element 20, and between the particulate filter element 10 and the partitions. In particular, the angle between the outer leg 11 of the particulate filter element 10 and the adjacent leg 21 of the sorbent filter element 20 may vary from 0°, where the outer leg 11 and the sorbent leg 21 are parallel, to 90° minus one-half of the included angle between the outer legs 11. The angle is preferably in the range from about 10° to about 80°.

The angle between the outer leg 11 of the particulate filter element 10 and the adjacent leg 21 of the sorbent filter element 20 depends in part on the shape of the sorbent filter element 20 and the ratio $H'/H$, where $H'$ is the height of the inner legs 12 of the particulate filter element 10 and the inner legs 12 of the particulate filter element 10 and H is the height of the outer legs 11. The ratio $H'/H$ is preferably less than 1 but greater than 0 and most preferably in the range from about 0.2 to about 0.6. In one example, $H'$ equals about 2.3 inches and H equals about 5.6 inches.

The ability to select an angle and/or a ratio within a given envelope to optimize performance of the filter device is particularly advantageous because of the different flow characteristics of the particulate filter element and the sorbent filter element. The angle and/or the ratio may be selected to optimize such parameters as pressure drop across the filter device, the amount and/or size of the particulate matter removed by the filter device, and the odor reducing capability of the filter device.

For example the angle and/or the ratio $H'/H$ may be selected in accordance with the type and/or the amount of contaminants in the air to be filtered. A filter device for air laden with particulates but having little odor-causing substances may have a higher ratio $H'/H$ and/or a larger angle (and therefore a smaller sorbent filter element) than a filter device for air laden with odor-causing substances and few particulates. Further, in a filter device having a relatively large ratio of $H'/H$ the amount of air flowing into the space between the particulate and sorbent filter elements would be greater than for a filter device having a smaller ratio of $H'/H$. The filter device with the larger ratio of $H'/H$ would also have larger angles between the outer legs of the particulate filter element and the legs of the sorbent filter element. Consequently, the filter device would accommodate the increased air flow without any noticeable penalty in the form of higher internal pressure loss or increase in the envelope.

A filtration device according to the present invention may comprise a single particulate filter element 10 and a single sorbent filter element 20 like the embodiment of FIG. 1. Alternatively, it may comprise a plurality of filter units installed side by side, each unit having a particulate filter element 10 and a sorbent filter element 20 as shown in FIG. 2.

Figure 2:
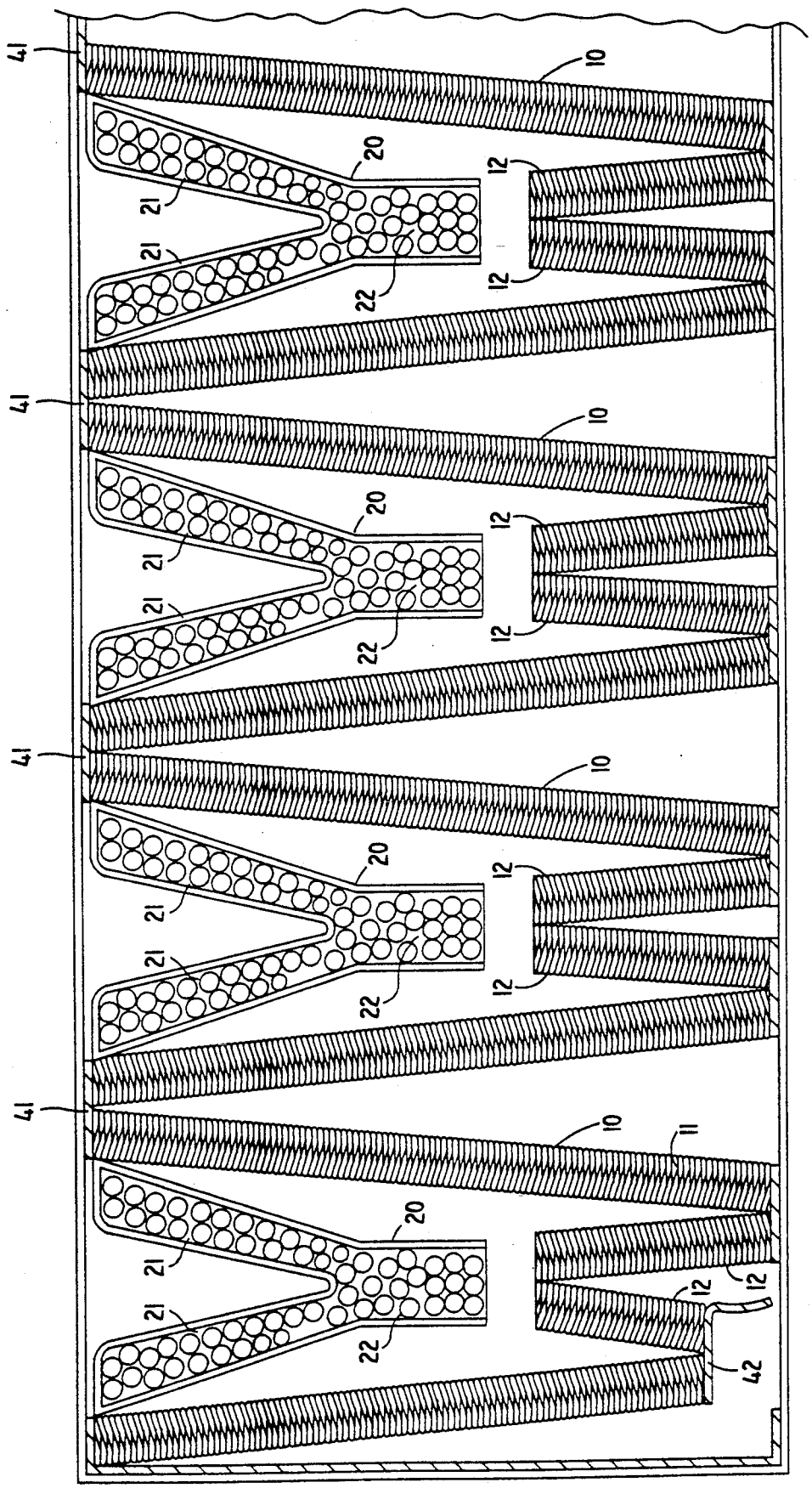
FIG. 2 is a cross-sectional view of a second embodiment of a filtration device according to the present invention.
Figure 3:
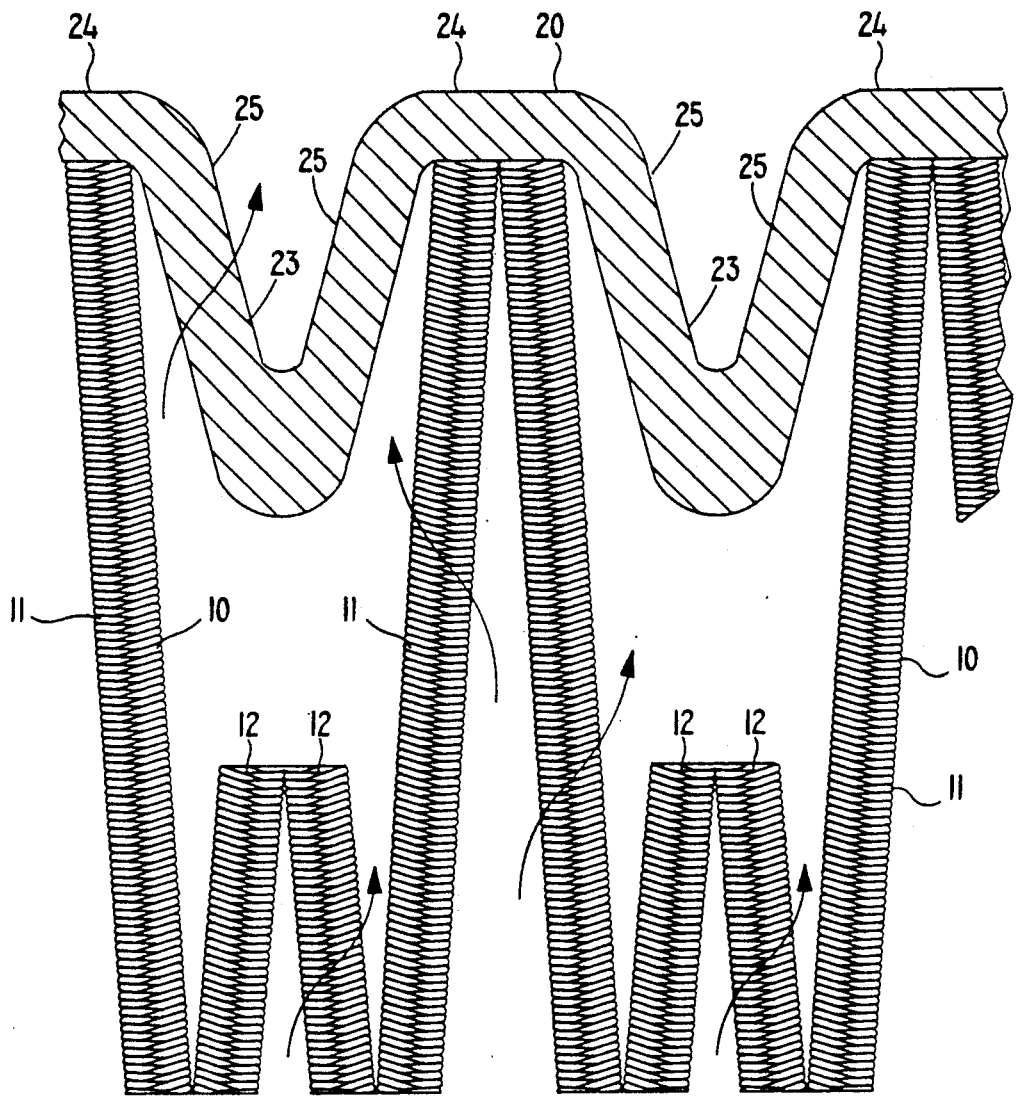
FIG. 3 is a cross-sectional view of a third embodiment of a filtration device according to the present invention.

A filtration device for installation in an aircraft is shown in FIG. 2. The filter device includes a plurality of particulate filter elements 10 and a plurality of sorbent filter elements 20 disposed on the downstream sides of the particulate filter elements 10, i.e., on the upper sides in FIG. 2. Each of the W-shaped particulate filter elements 10 can be a separate member, but preferably, they are all interconnected and formed from a single corrugated sheet so that the entire series of particulate filter elements 10 can be handled as a single unit.

The filter elements are installed inside a box-shaped housing 40. The top and bottom sides of the housing 40 are open to allow air to flow through the housing 40, while the remaining sides are enclosed so as to guide air through the housing 40. Louvers 41 may extend across the top and bottom sides of the housing 40 to give it structural rigidity and to provide support for the filter elements.

The particulate filter elements 10 can be secured to the inside of the housing 40 by any suitable means, such as by rivets or a bonding agent. In this embodiment, the upstream ends of the inner and outer legs and the downstream ends of the outer legs 11 of the particulate filter elements 10 are secured to the louvers 41. The legs of the particulate filter element 10 at the extreme outer ends of the assembly are made shorter than the legs of the other particulate filter elements 10 and are supported on support members 42 raised above the level of the louvers 41 so that air can enter into the space between the outer legs 11 and the wall of the housing 40.

The sorbent filter elements 20 may be installed in the housing 40 after the installation of the particulate filter elements 10 and are secured to the housing 40 by any suitable means, such as by rivets.

In the illustrated embodiments, the particulate and sorbent filter elements are typically parallelepiped members, i.e., they extend perpendicular to the plane of FIG. 1. However, it is possible for both filter elements to have different shapes. For example, they can both be bodies of revolution having a W-shaped cross-section and a V-shaped or Y-shaped cross-section, respectively. Namely, the particulate and sorbent filter elements can be generally conical in shape. When the particulate filter element 10 is flat, the pleats preferably run with the central vertex of the W-pleated particulate filter element 10. On the other hand, if the particulate filter element 10 is a body of revolution, the filter medium used to form the particulate filter element 10 is preferably corrugated such that the pleats extend in the direction which would make it easiest to bend the filter medium into a conical shape.

What is claimed is:

1. A filtration device comprising:
   a first filter having in cross-section first and second outer legs and first and second inner legs connected to each other at first ends and connected to the first and second outer legs, respectively, at second ends such that said first filter forms generally the shape of a W wherein the height of the first and second inner legs is less than the height of the first and second outer legs and a space is defined between the first and second outer legs, said first filter including a porous medium adapted to remove particulates from a gas; and
   a second filter having first and second legs, the first and second legs contacting the first and second outer legs of said first filter, respectively, at first ends to prevent bypass flow between the first and second legs of said second filter and the first and second outer legs of said first filter, respectively, said second filter being disposed in the space within said first filter, said second filter including a sorbent for removing or rendering innocuous undesirable substances in the gas.

2. A filtration device as claimed in claim 1 wherein said first and second legs of second are interconnected legs of second filter at second ends to prevent bypass flow between the first and second legs of the second filter.

3. A filtration device as claimed in claim 1 wherein the first and second legs of said second filter are connected to the first and second outer legs of said first filter, respectively, and the first and second legs of said second filter converge towards the first and second inner legs of said first filter.

4. A filtration device as claimed in claim 1 wherein each of the first and second legs of said second filter extend at an angle from the first and second outer legs of said first filter, respectively, the angle being greater than 0° and less than 90° minus one-half an included angle between the inner first and second outer legs.

5. A filtration device as claimed in claim 4 wherein the angle is in the range from about 10° to about 80°.

6. A filtration device as claimed in claim 1 wherein said first filter is a pleated particulate filter.

7. A filtration device as claimed in claim 6 wherein the W-shaped particulate filter has a central vertex, the first and second inner legs are joined at the central vertex, and the pleats extend in parallel to the junction of the inner legs.

8. A filtration device as claimed in claim 1 wherein said second filter has an upstream side and a downstream side, and said first filter is a pleated particulate filter disposed on the upstream side of said second filter.

9. A filtration device as claimed in claim 1 wherein said second filter comprises an adsorbent impregnated with an oxidizing agent.

10. A filtration device as claimed in claim 9 wherein the adsorbent comprises activated alumina impregnated with potassium permanganate.

11. A filtration device as claimed in claim 9 wherein said second filter comprises an adsorbent impregnated with a caustic alkali.

12. A filtration device as claimed in claim 1 wherein the ratio of the height of the first and second inner legs to the height of the first and second outer legs of the first filter is in the range from about 0.2 to about 0.6.

13. A filtration device as claimed in claim 1 wherein the first and second legs of said second filter converge towards the first and second inner legs of said first filter and said second filter further comprises a stem extending from the first and second legs of the second filter towards the first and second inner legs of the first filter to define generally a Y-shaped cross section.

14. A filtration device as claimed in claim 1 wherein said second filter comprises a plurality of troughs connected to one another, at least one trough being disposed in the space between the first and second outer legs of said first filter.

* * * * *

UNITED STATES PATENT AND TRADEMARK OFFICE
CERTIFICATE OF CORRECTION

PATENT NO. : 5,302,354
DATED : April 12, 1994
INVENTOR(S) : Jorn S. WATVEDT and Staffan B. LINNERSTEN It is certified that error appears in the above-indentified patent and that said Letters Patent is hereby corrected as shown below:

In Claim 2, column 7, line 48, change "second are interconnected legs of second filter" to --legs of the second filter are interconnected --.

Signed and Sealed this

Sixth Day of September, 1994

Attest:

BRUCE LEHMAN

Attesting Officer     Commissioner of Patents and Trademarks